US008776867B2

(12) United States Patent
Stojanowski (10) Patent No.: US 8,776,867 B2
(45) Date of Patent: *Jul. 15, 2014

(54) MODULAR, STACKABLE, GEOTHERMAL BLOCK HEAT EXCHANGE SYSTEM WITH SOLAR ASSIST

(76) Inventor: John Stojanowski, Staten Island, NY (US)

( * ) Notice: Subject to any disclaimer, the term of this patent is extended or adjusted under 35 U.S.C. 154(b) by 1022 days.

This patent is subject to a terminal disclaimer.

(21) Appl. No.: 12/803,145

(22) Filed: Jun. 21, 2010

(65) Prior Publication Data

US 2010/0258266 A1  Oct. 14, 2010

Related U.S. Application Data (63) Continuation-in-part of application No. 12/383,270, filed on Mar. 23, 2009, now Pat. No. 8,230,900.

(51) Int. Cl.
    *F24J 3/08*  (2006.01)

(52) U.S. Cl.
    USPC ............................................. 165/45; 165/163

(58) Field of Classification Search
    USPC .......................... 165/163, 10, 902, 45; 62/260
    See application file for complete search history.

(56) References Cited

U.S. PATENT DOCUMENTS

| 496,107 | A | * | 4/1893 | Baker | 237/8 R |
|---|---|---|---|---|---|
| 3,381,113 | A | * | 4/1968 | Jacques et al. | 392/346 |
| 4,325,228 | A | * | 4/1982 | Wolf | 62/260 |
| 5,339,890 | A | * | 8/1994 | Rawlings | 165/45 |
| 5,623,986 | A | * | 4/1997 | Wiggs | 165/45 |
| 5,694,515 | A | * | 12/1997 | Goswami et al. | 392/480 |
| 6,672,371 | B1 | * | 1/2004 | Amerman et al. | 165/45 |
| 6,932,149 | B2 | * | 8/2005 | Wiggs | 165/45 |
| 7,377,122 | B2 | * | 5/2008 | Kidwell et al. | 62/260 |
| 7,647,988 | B2 | * | 1/2010 | Roussy | 175/56 |
| 2004/0188071 | A1 | * | 9/2004 | Wilson et al. | 165/163 |
| 2005/0061472 | A1 | * | 3/2005 | Guynn et al. | 165/45 |
| 2008/0196859 | A1 | * | 8/2008 | Kidwell et al. | 165/45 |
| 2010/0059198 | A1 | * | 3/2010 | Amann et al. | 165/45 |
| 2010/0139736 | A1 | * | 6/2010 | Teichmann et al. | 136/246 |

FOREIGN PATENT DOCUMENTS

| EP | 57850 A2 | * | 8/1982 | F28D 7/02 |
|---|---|---|---|---|
| JP | 56157740 A | * | 12/1981 | F24F 5/00 |

* cited by examiner

*Primary Examiner* — Marc Norman
*Assistant Examiner* — Devon Russell (57) ABSTRACT

A modular, stackable, geothermal block system for use as a subterranean or submarine heat exchanger in a geothermal energy system which provides a heating/cooling means to an external load. The stackable blocks, which can be filled with a fluid and/or material of generally high heat retention characteristics or precast in such material, contain one or more continuous passageways that extend from the top face of each block through the opposing face, through which a rigid structural heat exchange tube, fabricated from material of high thermal conductivity, is placed. The blocks are stacked one upon another and slidably mounted on the tube(s). Each tube contains a helically wound, thermal transfer tubing comprising one leg of a U-shape configured loop. Each stackable block can contain multiple paired passageways permitting more than one U-shape loop within the system. The system can interface with a solar thermal collector system.

10 Claims, 6 Drawing Sheets

MODULAR, STACKABLE, GEOTHERMAL BLOCK HEAT EXCHANGE SYSTEM WITH SOLAR ASSIST

CROSS-REFERENCE TO RELATED APPLICATIONS

This application is a Continuation-In-Part application which claims benefit of U.S. patent application Ser. No. 12/383,270 filed Mar. 23, 2009 now U.S. Pat. No. 8,230,900, entitled "Modular, Stackable, Geothermal Block System" which is hereby incorporated by reference.

FEDERALLY SPONSORED RESEARCH

Not Applicable

SEQUENCE LISTING OF THE PROGRAM

Not Applicable

BACKGROUND OF THE INVENTION

The present invention relates to the improvement of the transfer of thermal energy to and from subsurface and submarine environments, with supplemental solar heating capability, to be utilized by any heating/cooling system as well as any power generating system that could exploit a temperature differential within a moving fluid.

Increasing awareness of the limited supply of fossil fuel reserves has raised interest in alternative energy sources. Cost conscious consumers have expressed interest in solar power and wind power alternative energy sources to supplement or replace conventional fossil-fuel based systems. Extensive research in these two fields and the fact that they are able to supplement an existing electrical infrastructure has focused much interest in these two areas. However, the limitations of weather-dependent solar and wind technologies are apparent. They are, in effect, interruptible electrical power suppliers.

Geothermal, a third source of energy, can provide a much more reliable source of alternative, renewable, non-polluting energy in a thermal form. The field of geothermal energy encompasses two substantially different disciplines. The first, involves the extraction of thermal energy in the form of steam from below-ground sources near (volcanic) magnetic regions. Water pumped into overlying ground fissures quickly absorbs abundant quantities of heat and is transformed to steam which is channeled to perform useful work. When the term "geothermal energy" is used, this method is often the one that is being described. However, the same term is often used to describe the second discipline, which is also the subject of the present invention. All references to "geothermal energy" in the description of the current invention will be based on the second discipline, which is described next. The second discipline is the transfer of thermal energy to and from relatively shallow depths below the surface of the Earth using a liquid, or vapor, thermal transfer medium at temperatures generally much lower than that of steam. This methodology is often referred to as ground-source heat transfer, earth-coupled, geothermal heat pump and GeoExchange systems. A subsurface, closed-loop system in which a finite amount of thermal transfer fluid is re-circulated to transfer heat between the earth and an above ground heating/cooling load is the most common ground source heat transfer system in use today although there are other open-loop type systems. Underground loops commonly fabricated from copper or polyethylene transport thermal transfer fluid, consisting of a refrigerant or aqueous solution, respectively, to an indoor facility to accomplish heating and/or cooling. Loops are placed in a predominantly vertical or horizontal orientation. Installation of vertical loop systems necessitates the use of bulky, expensive drilling rigs to drill one or more boreholes that are approximately four inches in diameter and one to four hundred feet deep. Within this deep narrow borehole a U-shape length of tubing is inserted to extract thermal energy from, or to put into, the ground by circulating a thermal transfer fluid within it. Horizontal loop systems require a substantially large surface area under which trenches approximately three or more feet in width and four to eight feet deep need to be excavated to install the loops in a variety of configurations. Loops fabricated from polyethylene, meant to carry an aqueous solution, must be considerably longer than their copper/refrigerant counterpart because the fluid they carry is at a much lower temperature differential relative to the surrounding earth and their thermal conductivity is much lower than that of copper. In addition, for both copper and polyethylene loops, the surrounding earth is susceptible to being depleted of thermal energy (in the heating mode) and saturated with thermal energy (in the cooling mode). In order for the average near-loop earth temperature to be nearly constant, and therefore an effective heat-sink, a loop of sufficient length is required to mitigate the depletion/saturation problem. This also mandates a minimum separation between loops. The near-loop depletion/saturation of thermal energy occurs because the heat capacity of soil, its ability to absorb a large amount of heat with only a small change in temperature, is not as high as some other materials. This property is known as specific heat. In addition, the surrounding soil's thermal conductivity varies based on soil composition, compaction and moisture content. The most effective material to surround the loops for heat transfer would be one that could absorb/release large amounts of thermal energy with the smallest change in temperature and also having high thermal conductance.

Based on the above considerations, there are two major impediments to the widespread implementation of ground-source geothermal systems, particularly for smaller residential applications. First, the installation of deep, vertical, borehole ground loop systems requires the use of expensive borehole drilling equipment with costly up-front capital expenditures resulting in a long payback period. Second, horizontal loop systems require a relatively large land surface area to be effective, severely limiting the pool of potential users. Their installation also has the potential to damage surface embellishment such as lawns and shrubbery, another discouraging factor.

Consequently, a ground-source geothermal system that could mitigate the above impediments would be desirable from both an installation cost and aesthetic perspective. A hybrid system that employed multiple, shallow, vertical boreholes, on the order of approximately twelve to twenty five feet deep and two to four feet in diameter, capable of being drilled more quickly by less expensive equipment than the large drilling rigs, would lower initial capital costs significantly. Such equipment is commonly used today to drill holes for utility and telephone pole installation. In order for the shallower borehole system to be effective, based on the above considerations, three implementation characteristics are necessary. They are:

1. The loop within the borehole cannot be the simple U-shape configuration with straight vertical segments; currently the standard method used for deep borehole geothermal systems. A method of increasing the effective loop contact area with the surrounding earth in a shallower borehole must be employed.

2. The loop must be surrounded by, and in thermal contact with, material of much higher heat retention characteristics than that of common soil. The heat retention characteristics of soil can vary widely depending on compaction; on composition, such as clay, sand or stone; and to a much greater degree based on moisture content. By surrounding the loop(s) with material of high, constant, heat retention characteristics with a large area of ground contact, the efficacy and efficiency of the system is enhanced and made resistant to ground thermal depletion fluctuations.
3. The system must be able to be assembled and installed with a minimum of expensive equipment and personnel costs.

Prior art geothermal disclosures have attempted to improve on requirement (1) above. U.S. Pat. No. 5,623,986 discloses a heat exchange system with a helically wound loop. A major disadvantage of this implementation is that only one-half of the subsurface loop is helically wound while the other uncoiled half is entirely insulated to eliminate intra-loop thermal "short-circuiting" between the two legs of the U-shape loop. The result is that only one-half of the U-loop is useful in heat transfer, and the additional expense of insulation material and its installation is incurred.

U.S. Pat. No. 5,054,541 discloses a ground coil assembly geothermal system designed for shallow depths. The design satisfies requirement (1) above with a helically wound loop which insures a large thermal transfer capability with the surrounding earth. A disadvantage is the possibility of thermal "short-circuiting" between sections of the loop, which are in close proximity. Because the entire unit is prefabricated and therefore must be transported to the installation site, there is a practical limitation on the borehole depth that can be used.

BRIEF SUMMARY OF THE INVENTION

It is therefore, an object of the present invention to provide an improved ground-source thermal exchange system that can be more widely used based on the combination of reduced installation cost and the relatively small above ground surface-area footprint required.

In accordance with this invention, there is provided a system composed of stackable, geothermal blocks, which can be assembled at the installation site. The blocks are either preformed containers that can be filled with material of high thermal capacity or non-containerized blocks cast from such material. By stacking the blocks, one upon another in a relatively shallow borehole, the need for expensive borehole drilling equipment currently used to drill deep wells is eliminated. Within the blocks, stacked one upon another and aligned, is at least one pair of passageways in the form of a U-shape in which a thermal transfer loop is placed; sections of the loop are helically wound to increase the total thermal transfer area. Multiple U-shape pairs of passageways within the stacked blocks, each having a loop, can be used in a single system. It is understood that a single passageway is possible in the present invention although the thermal transfer efficiency would be greatly reduced. Thermal transfer fluid, either a refrigerant or an aqueous solution, is circulated through the loop, or loops, to provide heating/cooling to an external load.

The modular design of the relatively shallow borehole system results in a low cost of installation because the stackable blocks, particularly those of the containerized design, can be filled at the installation site. Also, the need for expensive drilling, excavation or other specialized equipment and the associated high, skilled labor cost, is reduced. At any site, multiple installations of the system can be implemented and operated independently or connected in series/parallel arrangements.

The heating efficiency of existing geothermal systems, as measured by Coefficient of Performance (COP), usually range in COP values from 2 to 5. A COP of 2 corresponds to an efficiency of 200% in comparison with fossil fuel systems. The average heating COP is more likely to be about 3.5 for the entire heating season. The reason for this is the variance of ground temperatures surrounding the ground loops. There is a seasonal influence on this variance as well as a heating system usage component determined primarily by the ground loop design and size. A system that has a minimum ground loop size may effectively be "short-looped", resulting in lower COP when outside temperatures are at their lowest values. Increasing the loop length during installation mitigates this lowering of efficiency but the increased installation cost and increased fluid transfer pumping costs are a negative consequence.

The modular, stackable, geothermal block system disclosed herein can be supplemented with a solar hot water collector system. The helically wound ground loop is enclosed within a thermally conductive conduit within stacked blocks that can be sealed and either filled with a conductive grout material or a fluid, such as a solar transfer fluid. A solar thermal collector system, used for hot water heating or to supply domestic hot water, or both, can circulate some of its hot water in the conduit space surrounding the ground loop. This would result in a significant increase in seasonal COP for the geothermal system and would reduce the size, and therefore the cost, of the ground loop system needed. It could reduce the size of the geothermal heat pump required, also reducing the installation cost. Since the ground loop is not in direct physical contact with the surrounding ground, most of the thermal energy supplied by the solar hot water collector system would be absorbed by the loop and the high thermal mass of the modular, stackable blocks. In addition, not being in direct contact with the surrounding ground lessens that probability of damage to the ground loop from abrasion with rocks and pebbles. No additional storage tank would be needed to store the solar thermal transfer fluid for the geothermal system.

BRIEF DESCRIPTION OF THE SEVERAL VIEWS OF THE DRAWINGS

There are shown in the drawing embodiments of the invention as presently preferred. It should be understood, however, that the invention is not limited to the exemplary arrangements shown in the drawings, wherein.

DETAILED DESCRIPTION OF THE INVENTION

Within the drawings which describe the preferred embodiments of the present invention, like parts are identified with the same numerals.

Figure 1:
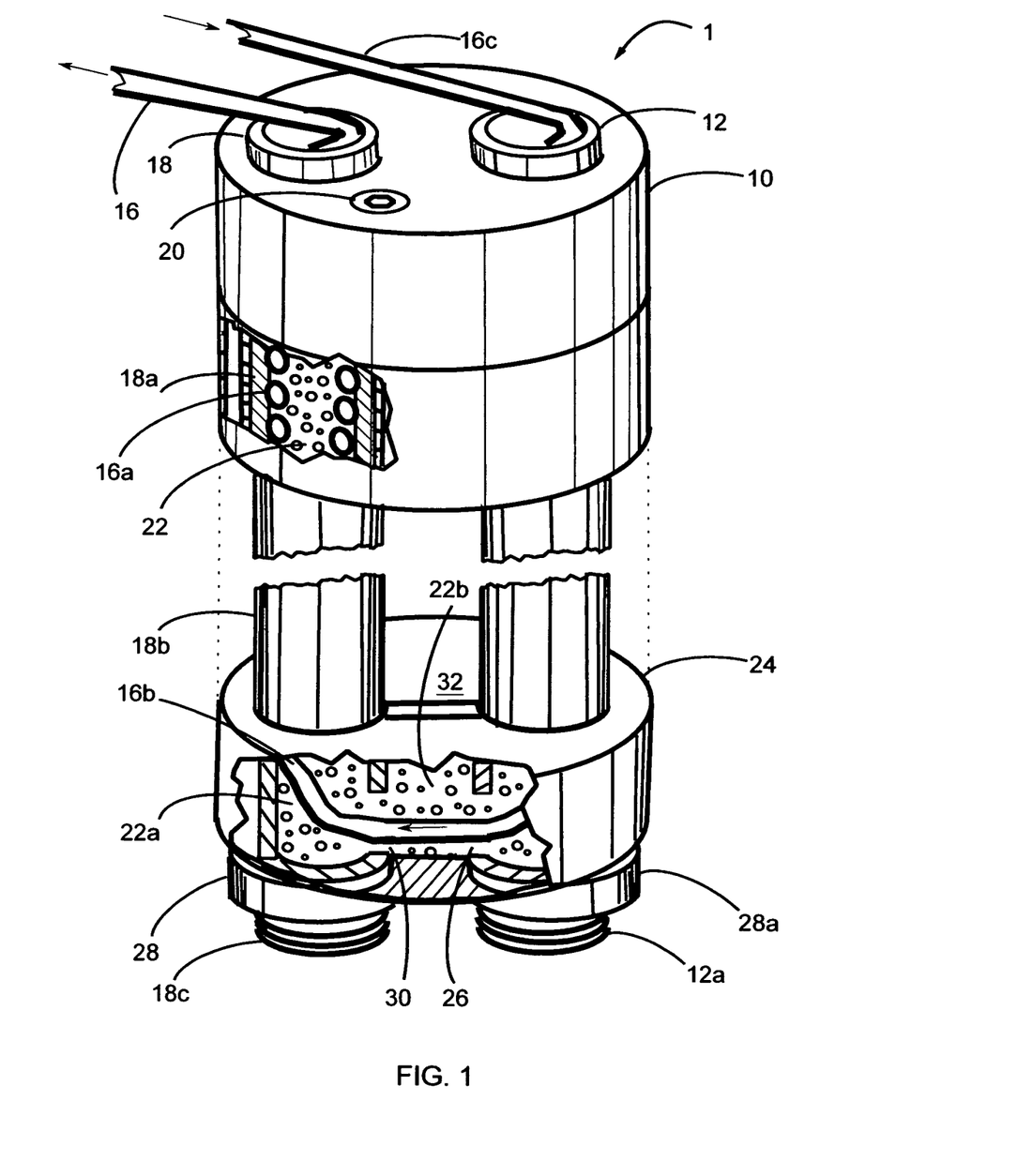
FIG. 1 is a perspective view, partly broken away, of an example of a partially assembled modular, stackable, geothermal block heat exchange system of the current invention.

FIG. 1 illustrates the position of the various elements of the modular, stackable, geothermal block heat exchange system 1 in relation to each other and as it would be assembled in a subsurface environment. The order of description of the elements will closely parallel the sequence of the preferred method of assembly of the system.

Thermally conductive tubing 16, contains two helically coiled segments of equal length separated by centrally located uncoiled section 16b. Both ends of the tubing, 16 and 16c, are also uncoiled. One end of the tubing is inserted into the distal, threaded end of a thermally conductive tube 18c and drawn through until the coiled section is totally surrounded by the tube 18. As the tubing is drawn through the tube, a thermally conductive grout 22a is inserted so that any space between the tubing coils and between the tubing and tube are filled. It is possible to perform the grouting procedure after the entire helically wound coil has been inserted. The second half of the tubing is inserted into the distal, threaded end of tube 12a using the same procedure described for the first half of the tubing. When in place, the U-shape distal end of the tubing passes through an aperture 30 located at the distal end of tube 18 and an aperture 26 located at the distal end of tube 12. A cross sectional view of part of the tube 18a displays a cross sectional view of the helically wound tubing 16a surrounded by the thermal grout 22. It should be noted that the above constructive process can be performed at the location of the installation of the system or preassembled offsite. The terminal, stackable, geothermal unit 24, of which there is only one in a system, serves as the base for all other stackable units. It surrounds the U-shape part of the tubing 16b, protecting it from being damaged and sealing it in thermally conductive grout 22b. The terminal unit is slidably mounted on the distal end of tubes 18 and 12. A transverse passageway 32 within the terminal unit permits the U-shape portion of the tubing to be positioned within it. Fastening means 28 and 28a, threaded caps in this embodiment, attach the terminal unit to the two tubes and prevent the leakage of the thermal grout 22a.

The assembled support structure just described including the tubes 18 and 12, the embedded helically wound thermal transfer tubing 16, the terminal stackable geothermal unit 24 and fasteners 28 and 28a, can now be inserted into a borehole.

Once positioned in a borehole, blocks of stackable a geothermal unit 10 can be slidably lowered so that the two tubes 18 and 12, pass through the corresponding passageways in the blocks. The blocks can be constructed in two ways; either as containers which can be filled with fluids of material of high thermal capacity or cast from such material into a solid, non-containerized unit. It is also possible for a material to be cast within the containers, either at the installation site or at an offsite location. If the block is a container, a fill orifice and flush-mounted cap 20 is provided. As has been noted, the system can be placed in a borehole. It can also be placed within a trench in a generally horizontal position, however, its orientation is not limited to a vertical or horizontal one. The system can also serve in a submarine location where the protection of the thermal transfer tubing would be enhanced by the surrounding elements of the system.

Figure 2A:
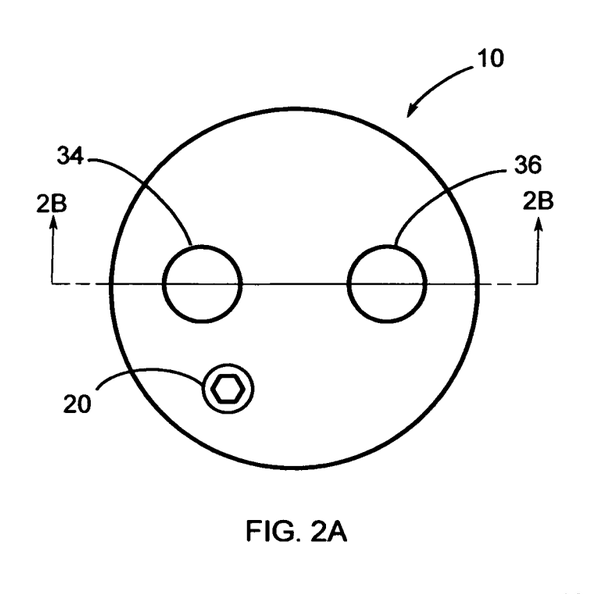
FIG. 2A is a top view of a container-type stackable, geothermal block unit, showing two passageways that extend through the block as well as a flush-mounted filler cap which seals the unit.

FIG. 2A is a top view of the stackable, geothermal block unit 10, a plurality of which would normally be used in the construction of a system although a system with a single unit is feasible and practicable. In the unit illustrated there are two passageways 34 and 36 that extend from one face to, and through, the opposing face. Although one pair of passageways is illustrated, multiple pairs of passageways are feasible and practicable. Each pair of passageways would enclose a separate U-shape thermal transfer loop. The individual loops can then be connected in a series, parallel or a series/parallel arrangement to provide the thermal transfer fluid to/from an external load.

The unit can be cast from a material of high thermal capacity. It can also be formed as a container capable of being filled through a sealable, fill aperture 20, with a fluid or substance of high thermal capacity.

Figure 2B:
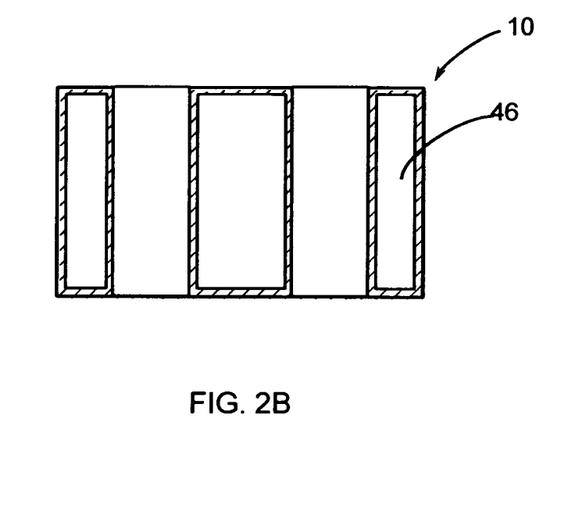
FIG. 2B is a sectional view of the stackable geothermal block unit of FIG. 2A.

FIG. 2B is a cross sectional view of the stackable geothermal block unit 10 of FIG. 2A, which is illustrated as a container-type unit showing the hollow interior space 46.

Figure 3A:
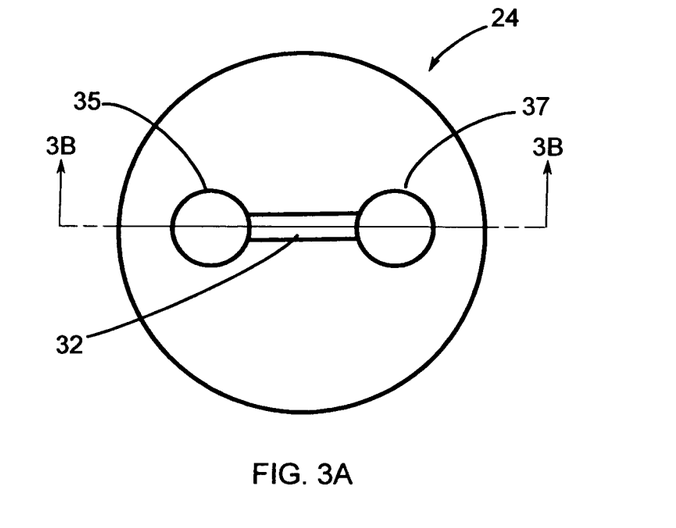
FIG. 3A is a top view of a terminal, stackable, geothermal block unit showing two passageways that extend through the block as well as a transverse passageway that joins the two passageways that extend through the block to forming a continuous U-shape passageway.

FIG. 3A is a top view of a terminal, stackable, geothermal block unit 24, only one of which would be used in the construction of a system and would be placed at the distal end thereof. In the unit illustrated there are two passageways 35 and 37 that extend from one face to, and through, the opposing face. It should be noted that multiple pairs of passageways are feasible and practicable. However, the number of passageways in the terminal unit must match the number of similar passageways in the stackable geothermal block units that overlie the terminal unit. The terminal unit, when assembled as part of the system, encloses the U-shape central portion of the helically wound thermal transfer tubing and contains a transverse passageway 32 through which the tubing can be inserted and surrounded with thermally conductive grout. The unit illustrated is one that is cast from a material of generally high thermal capacity although it could be fabricated in a different manner to lessen its weight while maintaining its resistance to compression.

Figure 3B:
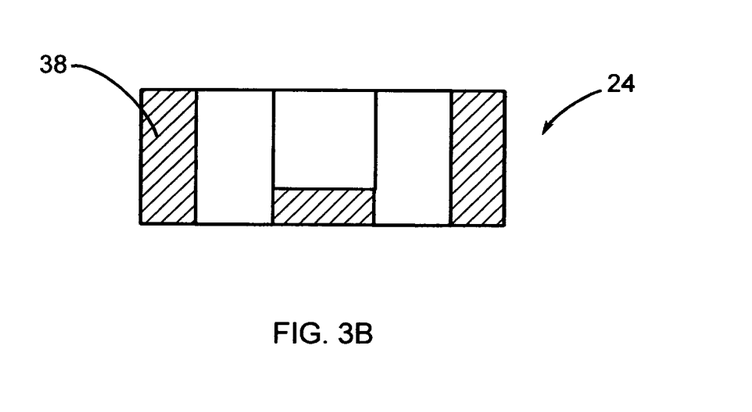
FIG. 3B is a sectional view of the terminal, stackable, geothermal block unit of FIG. 3A.

FIG. 3B is a cross sectional view of the terminal, stackable block unit 24 of FIG. 3A, which is shown as a unit that has been cast from material 38, of generally high thermal capacity.

Figure 4A:
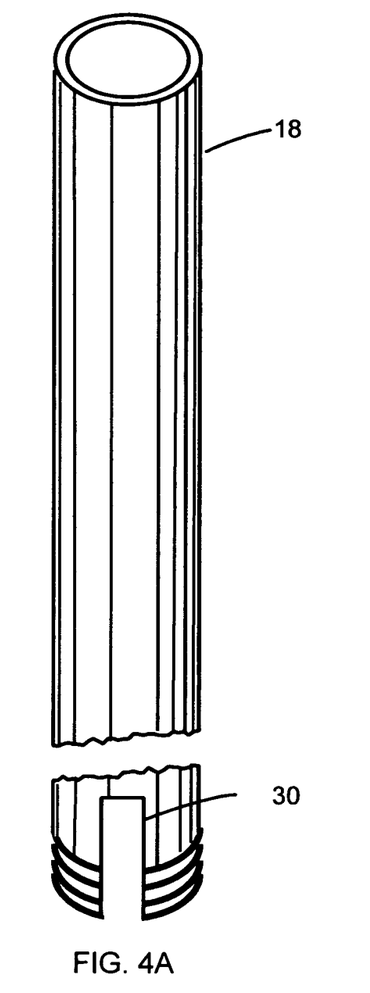
FIG. 4A is a perspective view, partly broken away, of a tube, threaded on the distal end, on which the stackable, geothermal block units can be slidably mounted and in which the helically wound thermal transfer tubing is inserted.

FIG. 4A is a partially broken perspective view of a thermally conductive tube 18. When used in the assembled system, the stackable, geothermal block units would be slidably mounted on the tube using the corresponding passageway of each unit. Part of a helically coiled thermal transfer tubing would be placed within the tube, along with thermal conducting grout, so that the U-shape central portion of the tubing would extend through aperture 30 on the threaded, distal end of the tube. The generally uncoiled proximal end of the tubing would extend out of the proximal end of the tube. It should be noted that a system with multiple pairs of tubes is feasible and practicable. A system with just one tube can be constructed but it would be much less efficient than a system with multiple tubes.

Figure 4B:
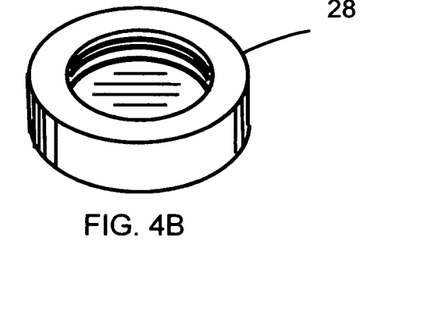
FIG. 4B is a perspective view of a threaded cap used to secure the terminal stackable geothermal block unit to the threaded end of the tube of FIG. 4A.

FIG. 4B is a perspective view of a threaded cap 28 used to keep the stackable, geothermal blocks that are slidably mounted on the thermally conductive tube from moving relative to the tube. It also seals the bottom of the tube to prevent the loss of heat conducting grout.

Figure 5:
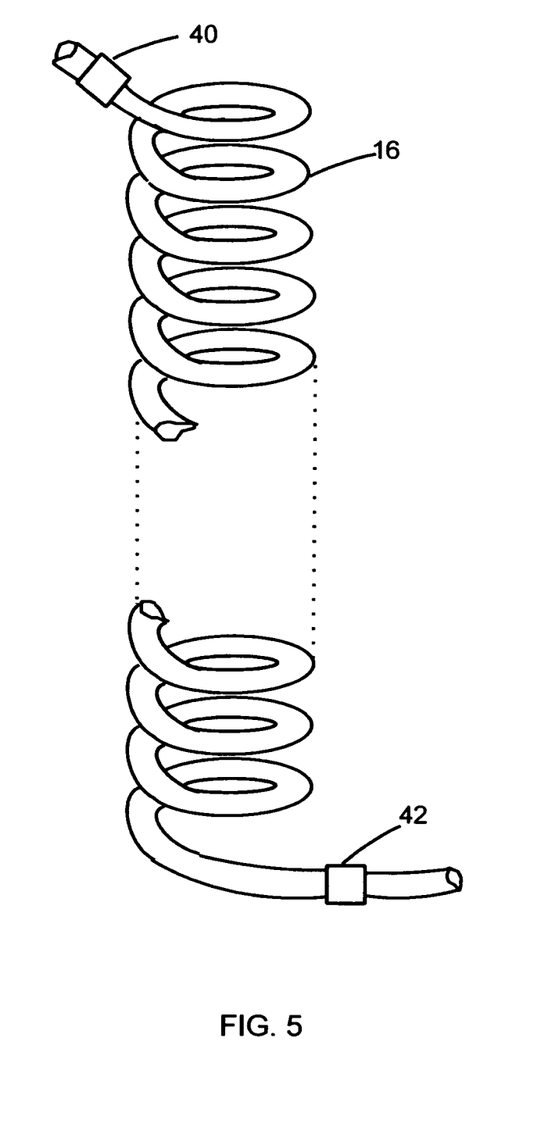
FIG. 5 is a perspective view, partly broken away, of approximately one-half of a helically wound thermal transfer tubing that is placed within the tube of FIG. 4A.

FIG. 5 is a partially broken, perspective view of approximately one-half of a helically wound thermal transfer tubing 16. The coiled portion of the tubing would be placed within a thermally conductive tube along with heat conducting grout. The tubing serves as a conduit for a thermal transfer fluid, generally either an aqueous solution or refrigerant, to effect an exchange of thermal energy with an external load. Illustrated are two optional couplings 40 and 42. To facilitate the placement of the system in a borehole or trench, it might be expedient to cut the proximal ends of the tubing a short distance from the system and then to reattach the tubing once the system was completely assembled below ground. In this instance coupling 40 would be necessary if the tubing were fabricated from copper. If the tubing were fabricated from a material like polyethylene, a coupling could be used but heat fusion welding could also be applied, making the coupling unnecessary. Coupling 42 would normally be unnecessary, however, in the installation of a direct exchange (DX) system, a refrigerant is used as the thermal transfer fluid and would exist in both a liquid and vapor state within the copper tubing. Therefore, in a DX system, it might be advantageous to have two sections of copper tubing of different diameters. Coupling 42 could then be used to attach tubing of two different sizes (not shown).

Figure 6:
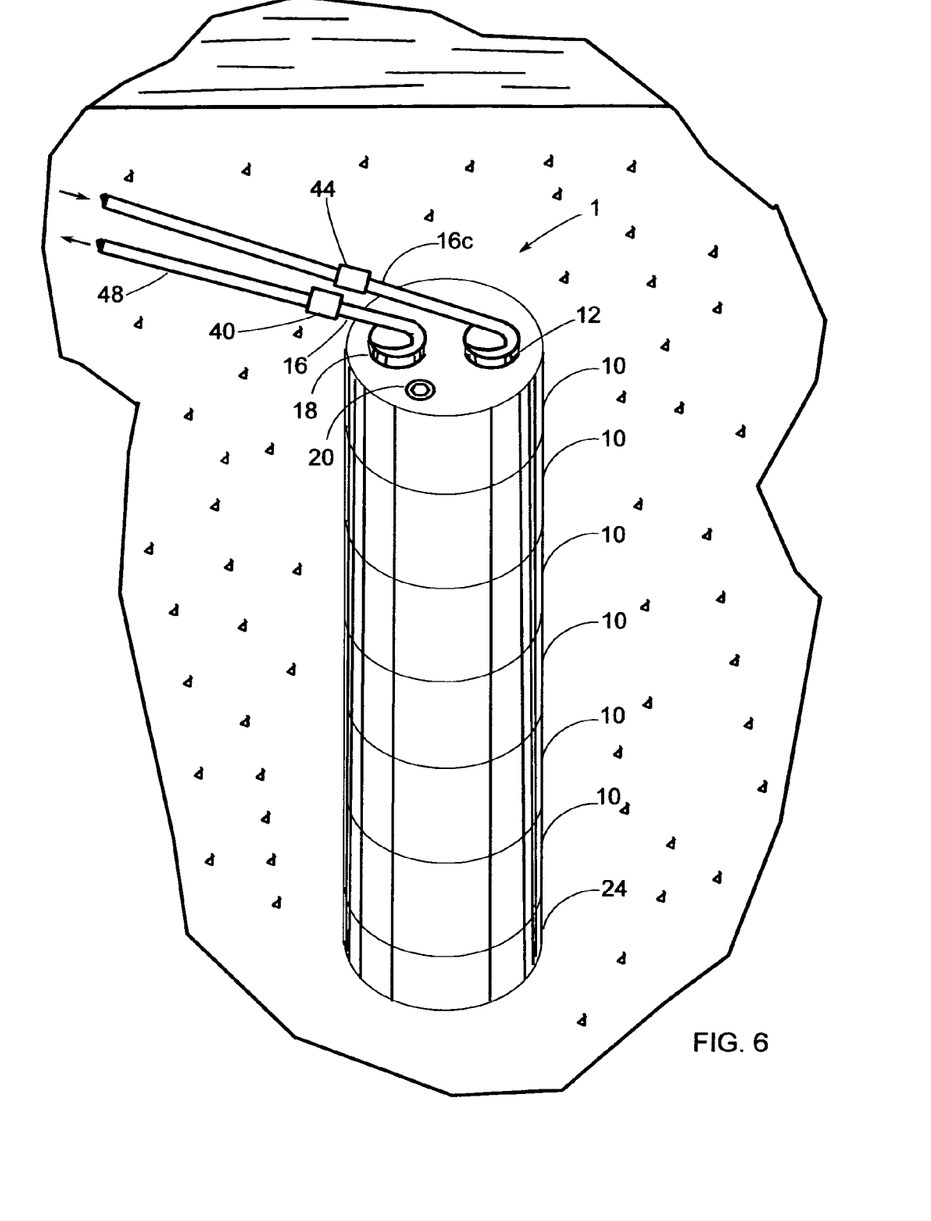
FIG. 6 is a perspective view of an example of an assembled, modular, stackable, geothermal block heat exchange system placed in a subsurface environment.

FIG. 6 is a perspective view of an example of a modular, stackable, geothermal block heat exchange system 1 that has been placed in a borehole. Shown are the terminal geothermal unit 24 with six overlying stackable, geothermal heat exchange units 10. The proximal ends of thermally conductive tubes 18 and 12 are shown. Extending from the tubes are the proximal ends of helically wound thermal transfer tubing 16 and 16c. Tube couplings 40 and 44 are optional and would be used if the tubing was cut to expedite the subsurface placement of the system. Tubing 48, extending from coupling 40, to the heating/cooling load would normally be insulated (not shown) in order to prevent thermal "short-circuiting" to the surrounding subsurface environment.

Figure 7:
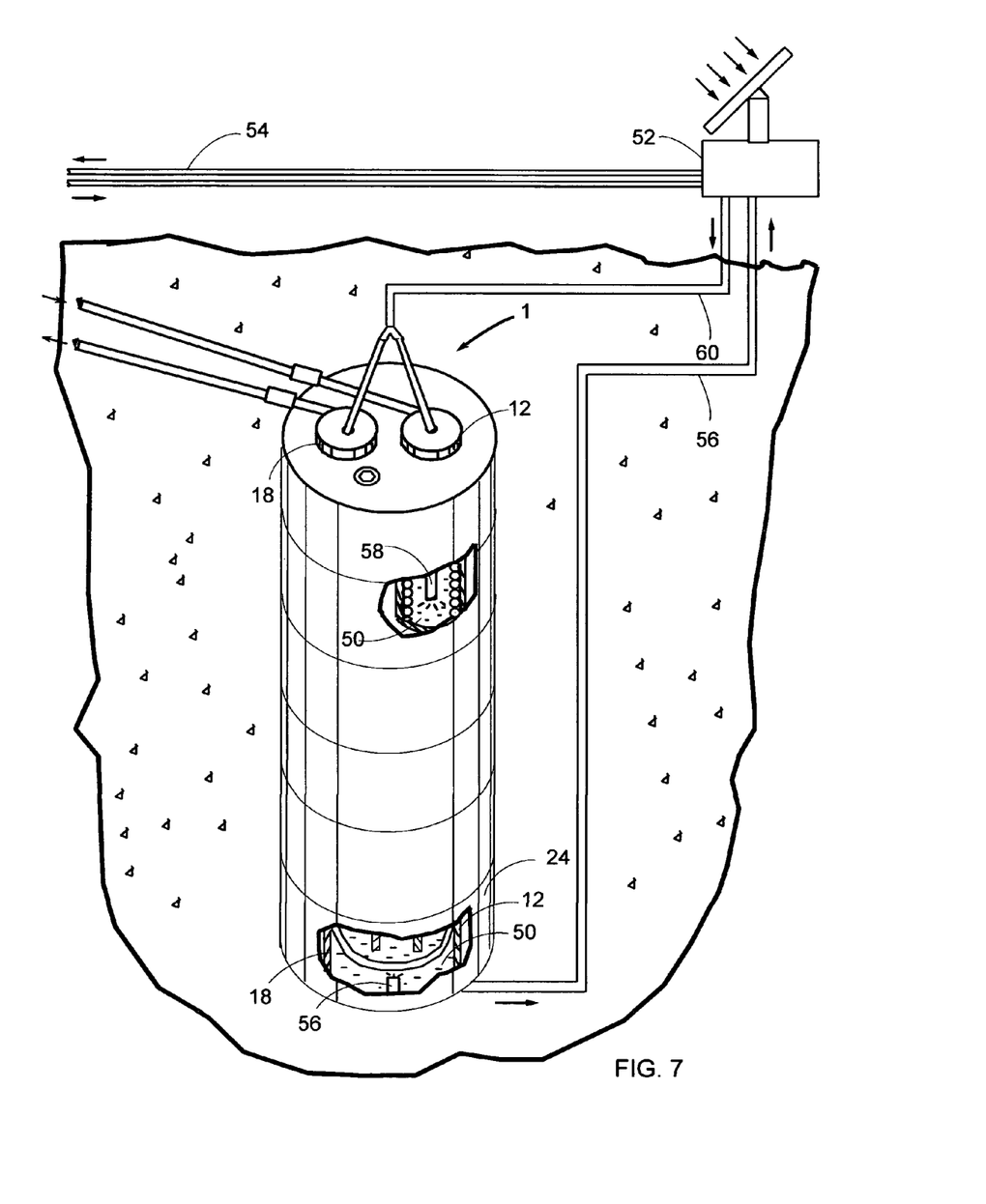
FIG. 7 is a perspective view of an example of an assembled, sealed, modular, stackable, geothermal block heat exchange system placed in a subsurface environment that is supplemented by a solar hot water collector system.

FIG. 7 is a perspective view of an example of a sealed, modular, stackable, geothermal block heat exchange system 1 that has been placed in a borehole that is being supplemented by a solar hot water collector system 52. This embodiment of the present invention is the same as shown in FIG. 6 with the following modification:

Thermally conductive material, such as a grout compound, within the thermally conductive tubes 12 and 18 and the terminal stackable geothermal unit 24 is replaced with a solar thermal transfer fluid 50.

Solar thermal transfer fluid 50 is delivered from a solar thermal collector system 52. This particular system is also delivering hot water for heating and/or domestic hot water usage using the piping 54. Heated solar thermal fluid 50 is delivered to the modular, stackable geothermal block heat exchange system 1 through the proximal sealed ends of the thermally conductive tubes 12 and 18 and discharged at an adjustable depth as shown at outlet pipe 58 in thermally conductive tube 12.

The proximal ends of thermally conductive tubes 12 and 18 are sealed to contain the solar thermal transfer fluid 50 within the modular, stackable geothermal heat exchange system 1.

Solar thermal transfer fluid 50 is withdrawn from terminal stackable geothermal unit block 24 at the inlet of pipe 56 and pumped to solar thermal collector system 52 where it is heated and sent to either the domestic hot water/heating load through pipe 54 or to the modular, stackable geothermal block heat exchange system 1 through pipe 60, or to both.

The preceding description, given by way of example in order to enable one of ordinary skill in the art to practice the claimed invention, is not to be construed as limiting the scope of the invention, which is defined by the claims of the current invention.

I claim:

1. A geothermal and solar thermal heat exchange system comprised of a plurality of stackable geothermal heat exchange units stacked upon one another, wherein: said units each comprise: a hollow, fillable container having opposed faces, at least one continuous passageway extending from one face of the unit to and through the opposing face, and no permanently integrated thermal transfer fluid tubing; wherein the opposed faces and at least one continuous passageway of the fillable container define a sealed space; wherein said units, when stacked with other stackable geothermal heat exchange units in a geothermal and solar thermal heat exchange system, are oriented in a manner such that said at least one continuous passageway of each unit form at least one multi-unit, continuous passageway extending through all stackable geothermal heat exchange units; wherein a cylindrical conduit of non-corrosive material passes through the at least one multi-unit, continuous passageway and a solar thermal heat exchange fluid flows through the cylindrical conduit.

2. The geothermal and solar thermal heat exchange system according to claim 1, wherein: a helically wound thermal transfer tubing is placed inside the cylindrical conduit.

3. The geothermal and solar thermal heat exchange system according to claim 2, wherein: the at least one continuous passageway comprises multiple, paired passageways, and the helically wound thermal transfer tubing inside the cylindrical conduit is joined at the distal ends to form a U-shaped loop.

4. The geothermal and solar thermal heat exchange system according to claim 3, comprising: a terminal, stackable geothermal heat exchange unit comprising: at least one pair of continuous passageways extending from one face to and through an opposing face, and a continuous, transverse passageway joining the paired continuous passageways; the terminal, stackable unit is located at the distal end of the stack of geothermal heat exchange units; and the U-shaped loop is protected by the terminal unit from external contact.

5. The geothermal and solar thermal heat exchange system according to claim 4, wherein: the solar thermal heat exchange fluid is circulated between the stack of units and a solar thermal heat collector means.

6. The geothermal and solar thermal heat exchange system according to claim 5, wherein: the stack of units is placed in a borehole.

7. The geothermal and solar thermal heat exchange system according to claim 5, wherein: the stack of units is placed in an excavated trench.

8. The geothermal and solar thermal heat exchange system according to claim 5, wherein: the stack of units is placed in a body of water.

9. The geothermal and solar thermal heat exchange system according to claim 5, wherein: the system is utilized for the direct and indirect heating and cooling of structures.

10. The geothermal and solar thermal heat exchange system according to claim 5, wherein: the system is utilized for the production of electrical and mechanical power.

* * * * *